United States Patent [19]

Heinrich et al.

[11] Patent Number: 5,292,837
[45] Date of Patent: Mar. 8, 1994

[54] PROCESS FOR THE PREPARATION OF ETHYLENE (CO)POLYMERS

[75] Inventors: Andreas Heinrich, Hofheim am Taunus; Ludwig Böhm, Hattersheim am Main; Hans-Albrecht Scholz, Hochheim am Main, all of Fed. Rep. of Germany

[73] Assignee: Hoechst Aktiengesellschaft, Frankfurt, Fed. Rep. of Germany

[21] Appl. No.: 925,983

[22] Filed: Aug. 5, 1992

[30] Foreign Application Priority Data

Aug. 7, 1991 [DE] Fed. Rep. of Germany ....... 4126093

[51] Int. Cl.$^5$ ................................................. C08F 4/64
[52] U.S. Cl. .................................. 526/114; 526/113; 526/118; 526/119; 526/124; 526/348.6; 526/352; 502/113
[58] Field of Search ................ 526/124, 119, 118, 113, 526/114

[56] References Cited

U.S. PATENT DOCUMENTS

| | | | |
|---|---|---|---|
| 4,245,071 | 1/1981 | Kondo et al. | 526/114 |
| 4,253,984 | 3/1981 | Imai et al. | 252/429 B |
| 4,364,851 | 12/1982 | Shiga et al. | 526/125 |
| 4,390,671 | 6/1983 | Imai et al. | 526/125 |
| 4,562,170 | 12/1985 | Graves | 502/113 |
| 4,716,206 | 12/1987 | Fujita et al. | 526/139 |
| 4,859,749 | 8/1989 | Franke | 526/124 |

FOREIGN PATENT DOCUMENTS

| | | |
|---|---|---|
| 366706 | 5/1982 | Austria . |
| 0007800 | 2/1980 | European Pat. Off. . |
| 0083456 | 7/1983 | European Pat. Off. . |
| 302242 | 2/1989 | European Pat. Off. . |
| 0398167 | 11/1990 | European Pat. Off. . |
| 398167 | 11/1990 | European Pat. Off. . |
| 2543437 | 4/1976 | Fed. Rep. of Germany . |
| 3215655 | 11/1982 | Fed. Rep. of Germany . |
| 4017661 | 12/1991 | Fed. Rep. of Germany . |
| WO91/18934 | 12/1991 | PCT Int'l Appl. . |

OTHER PUBLICATIONS

Derwent Abstract of DE 3325221 (laid open Jan. 24, 1985).

*Primary Examiner*—Joseph L. Schofer
*Assistant Examiner*—David Wu
*Attorney, Agent, or Firm*—Connolly & Hutz

[57] ABSTRACT

For the homopolymerization of ethylene or for the copolymerization of ethylene with other 1-olefins, a catalyst is used which comprises a trialkylaluminum compound and the entire product from the reaction of a magnesium alkoxide which is dissolved, suspended or dispersed as a gel in an inert solvent, with a tetravalent transition-metal compound and an organoaluminum compound, washing with an inert solvent and reacting with a halogenated metal compound. A polymer having coarse particles and a high bulk density is obtained.

9 Claims, No Drawings

PROCESS FOR THE PREPARATION OF ETHYLENE (CO)POLYMERS

DESCRIPTION

The invention relates to a process for the (co)polymerization of ethylene to give coarse polymer particles having a narrow particle size distribution and high bulk density by using catalyst particles obtained by aftertreating Ti(III)-containing Ziegler-Natta catalysts whose support component is a magnesium alkoxide with metal halides, in particular $TiCl_4$.

Processes are known for the preparation of Ti(III)-containing Ziegler-Natta catalysts in which the support component used is a suspended, dissolved or soluble magnesium alkoxide or a gel dispersion of a magnesium alkoxide (cf. EP 302 242, EP 398 167, DE 33 25 221 and DE 40 17 661). In the (co)polymerization of ethylene, these catalysts generally give ethylene (co)polymers having a narrow molecular weight distribution.

The object was to find a simple process for the preparation of catalysts which allow the preparation of polymers having a large mean and uniform particle diameter and high bulk density. These polymers should furthermore have a moderate to broad molecular weight distribution (MFR 21.6/5 of greater than or equal to 11).

It has now been found that this object can be achieved if a magnesium alkoxide is allowed to react with a transition-metal compound, in particular a titanium compound, and then with an aluminum compound, the transition metal is reduced to a lower oxidation state, and the reaction product is then treated with a metal halide.

The invention thus relates to a process for the preparation of an ethylene polymer having a uniform coarse particle shape and high bulk density by polymerizing ethylene or ethylene with up to 10% by weight, based on the total amount of the monomers, of a 1-olefin of the formula $R^6$—CH=CH$_2$ in which $R^6$ is a straight-chain or branched alkyl radical having 1 to 12 carbon atoms, in suspension, in solution or in the gas phase, at a temperature of from 20° to 120° C. and at a pressure of from 2 to 60 bar, in the presence of a catalyst comprising the product of the reaction of a magnesium alkoxide with a tetravalent titanium compound and an organoaluminum compound, which comprises carrying out the polymerization in the presence of a catalyst which comprises
a) the entire product from the reaction
a1) of a magnesium alkoxide of the formula I $$Mg(OR^1)(OR^2) \quad (I)$$

in which $R^1$ and $R^2$ are identical and are an unbranched or branched alkyl radical having 1 to 20 carbon atoms or a —$(CH_2)_nOR^3$ radical where $R^3$ is an alkyl radical having 1 to 4 carbon atoms and n is an integer from 2 to 6, which is dissolved, suspended or dispersed as a gel in an inert solvent, with a2) a tetravalent transition-metal compound of the formula II $$M^1X_m(OR^4)_{4-m} \quad (II)$$

in which $M^1$ is titanium, zirconium or hafnium, $R^4$ is an alkyl radical having 1 to 9 carbon atoms, X is a halogen atom and m is an integer from zero to 4, and a3) an organoaluminum compound of the formula III $$AlR^5_pX_{3-p} \quad (III)$$

in which $R^5$ is an alkyl radical having 1 to 6 carbon atoms, X is a halogen atom and p is a number from zero to 3, in the Mg : $M^1$ : Al ratio of 1 : 0.05 to 10 : 0.01 to 4, washing the solid with an inert solvent and reacting the product with a4) a metal halide of the formula IV $$M^2Cl_4 \quad (IV)$$

in which $M^2$ is titanium, silicon or tin, or $BCl_3$, in the $M^1$ : $M^2$ ratio of from 1 : 0.5 to 100, and washing the solid with an inert solvent, and
b) a trialkylaluminum compound having 1 to 6 carbon atoms in the alkyl radicals or the product of the reaction of a trialkylaluminum compound or dialkylaluminum hydride with isoprene.

To prepare the mixed catalyst component to be employed according to the invention, a magnesium alkoxide of the formula (I)

$$Mg(OR^1)(OR^2) \quad (I)$$

is used. In this formula, $R^1$ and $R^2$ are identical or different and are an unbranched or branched alkyl radical having 1 to 20 carbon atoms, preferably 2 to 10 carbon atoms, or a —$(CH_2)_nOR^3$ radical where $R^3$ is a $C_1$- to $C_4$-alkyl radical, preferably a $C_1$- to $C_2$-alkyl radical, and n is an integer from 2 to 6.

Examples of magnesium alkoxide of this type are
magnesium bismethoxide,
magnesium bisethoxide,
magnesium bis-i-propoxide,
magnesium bis-n-propoxide,
magnesium bis-n-butoxide,
magnesium methoxyethoxide,
magnesium ethoxy-n-propoxide,
magnesium bis(2-methyl-1-pentoxide),
magnesium bis(2-methyl-1-hexoxide),
magnesium bis(2-methyl-1-heptoxide),
magnesium bis(2-ethyl-1-pentoxide),
magnesium bis(2-ethyl-1-hexoxide),
magnesium bis(2-ethyl-1-heptoxide),
magnesium bis(2-propyl-1-heptoxide),
magnesium bis(2-methoxy-1-ethoxide),
magnesium bis(3-methoxy-1-propoxide),
magnesium bis(4-methoxy-1-butoxide),
magnesium bis(6-methoxy-1-hexoxide),
magnesium bis(2-ethoxy-1-ethoxide),
magnesium bis(3-ethoxy-1-propoxide),
magnesium bis(4-ethoxy-1-butoxide),
magnesium bis(6-ethoxy-1-hexoxide),
magnesium bispentoxide and
magnesium bishexoxide.

Preference is given to the simple magnesium alkoxides such as magnesium diethoxide, magnesium di-n-propoxide and magnesium di-i-butoxide. Other magnesium alkoxides which can be used are the products of the reaction of magnesium metal, alkylmagnesium compounds or magnesium alkoxides with alcohols $R^1OH$ ($R^1$ as above). Of these products, preference is given to the product of the reaction of a magnesium alkoxide with an alcohol $R^1OH$ in the presence of 0.02–0.2 mol % of triethylaluminum (as viscosity reducer) at from 100° to 140° C.

The magnesium alkoxide is employed as a suspension, solution or as a gel dispersion.

The magnesium alkoxide is first reacted with a tetravalent transition-metal compound of the formula II $$M^1X_m(OR^3)_{4-m} \qquad (II)$$

in which $M^1$ is titanium, zirconium or hafnium, preferably titanium or zirconium, $R^3$ is an alkyl radical having 1 to 9 carbon atoms, preferably 1 to 4 carbon atoms, X is a halogen atom, preferably chlorine, and m is zero to 4, preferably 2 to 4. The tetravalent transition-metal compound of the formula II or an adduct thereof with an electron donor, for example an ester, ether, ketone or the like, is soluble in hydrocarbons.

Examples which may be mentioned are: $TiCl_4$, $TiCl_3(OC_2H_5)$, $TiCl_2(OC_2H_5)_2$, $TiCl(OC_2H_5)_3$, $Ti(OC_2H_5)_4$, $TiCl_3(OC_3H_7)$, $TiCl_2(OC_3H_7)_2$, $TiCl(OC_3H_7)_3$, $Ti(OC_3H_7)_4$, $TiCl_3(OC_4H_9)$, $TiCl_2(OC_4H_9)_2$, $TiCl(OC_4H_9)_3$, $Ti(OC_4H_9)_4$, $TiCl_3(OC_6H_{13})$, $TiCl_2(OC_6H_{13})_2$, $TiCl(OC_6H_{13})_3$, $Ti(OC_6H_{13})_4$, $Ti(OC_9H_{19})_4$, $TiBr_4$, $TiBr_3(OR^3)$, $TiBr_2(OR^3)_2$, $TiBr(OR^3)_3$, $TiI_4$, $TiI_3(OR^3)$, $TiI_2(OR^3)_2$, $TiI(OR^3)_3$, $ZrCl_4$, $ZrBr_4$, $ZrI_4$, $Zr(OC_2H_5)_4$, $Zr(OC_3H_7)_4$, $Zr(OC_4H_9)_4$, $ZrCl_2(OC_3H_7)_2$, preferably $TiCl_4$, $ZrCl_4$, $Ti(OC_2H_5)_4$, $Ti(OC_3H_7)_4$, $Zr(OC_3H_7)_4$, $Ti(OC_4H_9)_4$ and $Zr(OC_4H_9)_4$. Particular preference is given to $TiCl_4$.

The third reactant for the preparation of the catalyst component a is an organoaluminum compound of the formula III $$AlR^4_pX_{3-p} \qquad (III)$$

in which $R^4$ is an alkyl radical having 1 to 6 carbon atoms, preferably 1 to 4 carbon atoms, X is a halogen atom, preferably chlorine, and p is a number from zero to 3, preferably 1 to 2, or the product of the reaction of a trialkylaluminum compound or dialkylaluminum hydride with a diene, preferably isoprene.

Suitable organoaluminum compounds are: $Al(C_2H_5)_3$, $Al(C_2H_5)_2Cl$, $Al_2(C_2H_5)_3Cl_3$, $Al(C_2H_5)Cl_2$, $AlCl_3$, $Al(C_3H_7)_3$, $Al(C_3H_7)_2Cl$, $Al_2(C_3H_7)_3Cl_3$, $Al(C_3H_7)Cl_2$, $Al(C_4H_9)_3$, $Al(C_4H_9)_2Cl$, $Al_2(C_4H_9)_3Cl_3$, $Al(C_4H_9)Cl_2$ and monohalides and dihalides of various composition. From this group, preference is given to $Al_2(C_2H_5)_3Cl_3$ and $Al(C_2H_5)_3$.

The catalyst component a is formed by the following possible routes, it also being possible to employ each reactant as a plurality of similar compounds.

i) The solution of the transition-metal compound is added to a solution, dispersion or suspension of the magnesium alkoxide, and the resultant solid is then reacted with an organoaluminum compound of the formula III.

ii) The solution or dispersion of a magnesium alkoxide and the solution of the transition-metal compound are added simultaneously to an initially introduced solvent, and the resultant suspension is reacted with an organoaluminum compound of the formula III.

iii) The solution or dispersion of a magnesium alkoxide, the solution of the transition-metal compound and an organoaluminum compound of the formula III are reacted with one another simultaneously in an initially introduced dispersant.

iv) The solution of the transition-metal compound is added to a solution, dispersion or suspension of the magnesium alkoxide, and the resultant solid is washed and then reacted with an organoaluminum compound of the formula III.

v) The solution or dispersion of a magnesium alkoxide and the solution of the transition-metal compound are added simultaneously to an initially introduced solvent, and the resultant solid is washed and then reacted with an organoaluminum compound of the formula III.

It is furthermore possible to carry out the preparation by combination of methods i) to v).

The reaction of the magnesium alkoxide with the tetravalent transition-metal compound is carried out at a temperature of from −50° to 150° C., preferably at from −20° to 120° C., for from 0.1 to 12 hours, preferably from 0.13 to 6 hours.

The reaction with the organoaluminum compound is carried out at a temperature of from −50 to 150° C., preferably at from −20° to 130° C., particularly preferably at from 20° to 120° C., for a period of from 0.1 to 10 hours, preferably for from 0.25 to 4 hours.

Suitable inert solvents for said reactions are aliphatic and cycloaliphatic hydrocarbons, such as butane, pentane, hexane, heptane, cyclohexane and isooctane, and aromatic hydrocarbons, such as benzene and xylene. It is also possible to employ gasoline and hydrogenated diesel oil fractions which have been carefully freed from oxygen, sulfur compounds and moisture.

The magnesium alkoxide, the tetravalent transition-metal compound ($M^1$) and the organoaluminum compound of the formula III are reacted in an Mg : $M^1$ : Al ratio of from 1 : 0.05 to 10 : 0.01 to 4, preferably from 1 : 0.08 to 4 : 0.02 to 3.

After the reaction, the suspension of the solid is stirred for from 0 to 48 hours, preferably for from 0.5 to 16 hours, at from 80° to 150° C., preferably at from 100° to 120° C., and then washed until the supernatant mother liquor is free from Cl and Ti (Zr, Hf).

The solid is subsequently mixed with a chlorinating compound of the formula IV $$M^2Cl_4 \qquad (IV)$$

in which $M^2$ is Ti, Si or Sn, or $BCl_3$, in an $M^1$ : $M^2$ (or B) ratio of from 1 : 0.2 to 100, preferably from 1 : 1 to 50, in particular from 1 : 1.5 to 20, and the mixture is stirred at a temperature of from 50° to 150° C. for from 0.1 to 100 hours, preferably for from 0 to 48 hours, in particular for from 1 to 30 hours. The resultant catalyst component a is subsequently washed repeatedly in order to remove soluble compounds.

The catalyst component b is a trialkylaluminum compound having 1 to 6 carbon atoms in the alkyl radicals, such as, for example, triethylaluminum, triisobutylaluminum, triisohexylaluminum or the product of the reaction of a trialkylaluminum compound or of a dialkylaluminum hydride with isoprene, which is known as isoprenylaluminum. Preference is given to triethylaluminum and isoprenylaluminum.

It is possible to preactivate the catalyst component a by means of a trialkylaluminum compound. This improves the shelf life of the component before polymerization and increases the polymerization activity. The actual activation with component b then takes place at the beginning of the polymerization.

The polymerization is carried out in one or two steps, preferably as suspension polymerization, in an inert dispersant. Suitable dispersants are the same organic solvents described for the preparation of the catalyst component a. However, polymerization in the gas phase is also possible.

The polymerization temperature is from 20° to 120° C., preferably from 70° to 90° C.; the pressure is in the range from 2 to 60 bar, preferably from 4 to 20 bar.

If the reaction is carried out in two steps, the mixing ratio between the polyolefins formed in steps 1 and 2 is in the range from 30 : 70 to 70 : 30.

The catalyst system used according to the invention is used to polymerize ethylene or ethylene with up to 10% by weight, based on the total amount of monomers, of a 1-olefin of the formula $R^7$—CH=CH$_2$ in which $R^7$ is a straight-chain or branched alkyl radical having 1 to 12 carbon atoms, preferably 1 to 10 carbon atoms. Examples are propylene, 1-butene, 1-pentene, 1-hexene, 1-octene and 4-methyl-1-pentene. Preference is given to propylene, 1-butene and 1-hexene. The co-monomer is preferably introduced in the first step, in which a polymer of relatively high molecular weight is formed.

The entire polymer from the second step is separated off from the dispersant in a known manner and dried.

A characteristic of the catalyst component a is a Cl/transition-metal ratio which is increased compared with the prior art and, in the case of reaction with TiCl$_4$, an increased titanium content, the content of Ti$^{3+}$ (Zr$^{3+}$, Hf$^{3+}$) not being reduced. This is connected with an increase in the mmol activity of the catalyst. The additional immobilization of titanium(IV) compounds requires an increase in the gram activity (kg of PE/g of component a), and thus an increase in the mean particle diameter and a broadening of the molecular weight distribution.

The particle size distribution of the polymer is highly uniform.

The molecular weight of the polyolefins is regulated efficiently by hydrogen.

The examples below serve to illustrate the invention. The following abbreviations are used:

| | |
|---|---|
| CTA$_{red}$ | reduced catalyst-time activity |
| MFI 190/5 | melt flow index in accordance with DIN 53735, measured at 190° C. and a load of 5 kg |
| MFI 190/15 | measured at 190° C. at a load of 15 or |
| MFI 190/21.6 | 21.6 kg respectively |
| MFR 15/5 | MFI 190/15/MFI 190/5 |
| MFR 21.6/5 | MFI 190/21.6/MFI 190/5 |
| d$_{50}$ | mean particle size, obtained by sieve fractionation |
| BD | bulk density, measured in accordance with DIN 53468 |
| Cl$_{corr.}$ | Cl - 2 Mg |
| VN | viscosity number in accordance with ISO/R 1191 |

COMPARATIVE EXAMPLE A

Preparation of the catalyst component a$_0$ 114.4 g of Mg(OC$_2$H$_5$)$_2$ and 1 dm$^3$ of diesel oil were introduced into a 2 dm$^3$ reactor fitted with stirrer, thermometer and dropping funnel. 500 cm$^3$ of TiCl$_4$ were metered in at 90° C. over the course of 6 hours. The white product was subsequently washed repeatedly until the Ti content of the suspension was less than 5 mmol/dm$^3$. 80 cm$^3$ of a 1 molar solution of triethylaluminum in diesel oil were subsequently added to the suspension, and the mixture was stirred at 120° C. for 12 hours. The brown-black solid was separated off and washed four times with 0.5 dm$^3$ of diesel oil.

Analysis: Mg : Ti : Cl=1 : 0.065: 2.102; Ti$^{3+}$/Ti$^{4+}$ =0.98; Cl$_{corr.}$/Ti=1.57.

COMPARATIVE EXAMPLE B

Polymerization of ethylene

Part of the suspension from Comparative Example A was diluted with diesel oil to a Ti concentration of 0.01 mol/dm$^3$. 3 cm$^3$ of a 1 molar triethylaluminum solution and 1 cm$^3$ of the dilute suspension were introduced at 85° C. under a blanket of N$_2$ into a 1.5 dm$^3$ steel autoclave containing 750 cm$^3$ of diesel oil. The autoclave was then flushed twice with hydrogen, and 2.15 bar of hydrogen and 4.85 bar of ethylene were injected. The overall pressure of 7 bar was maintained for 2 hours by replenishing consumed ethylene. The polymerization was terminated by decompressing the gases, and the polymer was separated off from the dispersant by filtration and drying. 208 g of polyethylene having an MFI 190/5 of 1.1 g/10 min and an MFR 21.6/5 of 10.2 were formed. This corresponds to a CTA$_{red}$ of 2144 g/mmol of Ti.bar.h or a CA of 12.6 kg of PE/g of component a. The powder had a bulk density of 360 g/dm$^3$ and contained 8% by weight of fine particles of <100 μm. The mean particle size d$_{50}$ was 197 μm.

EXAMPLE 1

Preparation of the catalyst component a 153.8 cm$^3$ (10 mmol of Ti) of the suspension of the catalyst component a$_0$ from Comparative Example A were transferred into a 250 cm$^3$ reactor, and 8.8 cm$^3$ of TiCl$_4$ were added at 120° C. The mixture was stirred at this temperature for 5 hours and subsequently washed six times with 200 cm$^3$ of diesel oil at 70° C. (Ti in the mother liquor <1 mmol/dm$^3$).

Analysis: Mg : Ti : Cl=1 : 0.108:2.253; Ti$^{3+}$/Ti$^{4+}$ =0.57; Cl$_{corr.}$/Ti=2.34.

The polymerization of ethylene was carried out in accordance with Comparative Example B. 219 g of polyethylene having an MFI 190/5 of 0.92 g/10 min and an MFR 21.6/5 of 13.4 were obtained. This corresponds to a CTA$_{red}$ of 2257 g/mmol of Ti.bar.h or a CA of 20.7 kg of PE/g of component a. The powder had a bulk density of 360 g/dm$^3$ and contained 4% by weight of fine particles. The mean particle size d$_{50}$ was 237 μm.

COMPARATIVE EXAMPLE C 228.8 g of Mg(OEt)$_2$ from Nippon Soda and 1600 cm$^3$ of diesel oil were dispersed for 24 hours at room temperature under a blanket of argon in a 4 dm$^3$ reactor using a high-speed stirrer (Ultra-Turrax from IKA). 180 cm$^3$ of the 1.11 molar solution were reacted at 85° C. for 4 hours with 200 cm$^3$ of a 0.3 molar TiCl$_4$ solution in diesel oil and at 110° C. for 2 hours with 200 cm$^3$ of a 0.8 molar Al$_2$Et$_3$Cl$_3$ solution in diesel oil. The batch was subsequently stirred at 110° C. for a further 1 hour. The suspension was then filtered at 110° C. and washed four times with 400 cm$^3$ of hot diesel oil. The red-brown product was taken up in 200 cm$^3$ of cold diesel oil. The analytical results are shown in Table 2.

The polymerization of ethylene was carried out in accordance with Comparative Example B, but at 2 bar of H$_2$ and 5 bar of C$_2$H$_4$. The polymerization results and the amount of catalyst and cocatalyst used are shown in Table 3.

COMPARATIVE EXAMPLE D 228.8 g of $Mg(OEt)_2$ and 1600 cm$^3$ of diesel oil were dispersed for 20 hours at room temperature under a blanket of argon in a 4 dm$^3$ reactor using a high-speed stirrer (Ultra-Turrax from IKA). 180 cm$^3$ of the 1.11 molar solution were reacted at 85° C. for 4 hours with 220 cm$^3$ of a 0.3 molar $TiCl_4$ solution in diesel oil and at 130° C. for 2 hours with 200 cm$^3$ of a 0.8 molar $Al_2Et_3Cl_3$ solution in diesel oil. The batch was subsequently stirred at 110° C. for a further 1 hour. The suspension was then washed five times with 400 cm$^3$ of diesel oil at 25° C. and the dark brown product was taken up in 200 cm$^3$ of diesel oil. The analytical results are shown in Table 2.

The polymerization of ethylene was carried out in accordance with Comparative Example B, but at 2 bar of $H_2$ and 5 bar of $C_2H_4$. The polymerization results and the amount of catalyst and cocatalyst used are shown in Table 3.

COMPARATIVE EXAMPLE E 800 cm$^3$ of a 0.5 molar solution of magnesium 2-methylpentoxide in diesel oil, 400 cm$^3$ of a 0.3 molar solution of $TiCl_4$ in diesel oil and 400 cm$^3$ of a 0.8 molar solution of $Al_2Et_3Cl_3$ in diesel oil were metered simultaneously at 25° C. over the course of 1 hour into 800 cm$^3$ of diesel oil in a 4 dm$^3$ reactor. The batch was subsequently diluted with 400 cm$^3$ of diesel oil, heated to 110° C. and stirred at this temperature for 2 hours. The suspension was filtered at 100° C., and the red-brown product was washed twice with 800 cm$^3$ of hot diesel oil. The analytical results are shown in Table 2.

The polymerization of ethylene was carried out in accordance with Comparative Example B, but at 2 bar of $H_2$ and 5 bar of $C_2H_4$. The polymerization results and the amount of catalyst and cocatalyst used are shown in Table 3.

COMPARATIVE EXAMPLE F 1500 cm$^3$ of a 0.4 molar solution of magnesium 2-methylpentoxide in diesel oil, 500 cm$^3$ of a 0.36 molar solution of $TiCl_4$ in diesel oil and 500 cm$^3$ of a 0.96 molar solution of $Al_2Et_3Cl_3$ in diesel oil were metered simultaneously at 25° C. over the course of 1 hour into 1000 cm$^3$ of diesel oil in a 4 dm$^3$ reactor. The mixture was subsequently diluted with 300 cm$^3$ of diesel oil, heated to 120° C. and stirred at this temperature for 3 hours. The suspension was filtered at 100° C., and the red-brown product was washed twice with 1 dm$^3$ of hot diesel oil and taken up in 1.5 dm$^3$ of diesel oil. The analytical results are shown in Table 2.

The polymerization of ethylene was carried out in accordance with Comparative Example B, but at 2 bar of $H_2$ and 5 bar of $C_2H_4$. The polymerization results and the amount of catalyst and cocatalyst used are shown in Table 3.

EXAMPLES 2 TO 15

Preparation of Component a

Component a was prepared analogously to Example 1. The type and amount of the initially introduced component $a_0$, the amount of $TiCl_4$ or halogenating agent and the time and temperature at which the reaction took place are shown in Table 1. The analytical results are listed in Table 2 and the polymerization results in Table 3.

TABLE 1

| Comp. a | Comp. $a_0$ 10 mmol from | Addition of | T [°C.] | t [h] |
|---|---|---|---|---|
| Ex. 2 | Comp. E | 50 mmol of $TiCl_4$ | 120 | 2 |
| Ex. 3 | Comp. F | 100 mmol of $TiCl_4$ | 120 | 2 |
| Ex. 4 | Comp. D | 50 mmol of $TiCl_4$ | 120 | 2 |
| Ex. 5 | Comp. C | 100 mmol of $TiCl_4$ | 120 | 2 |
| Ex. 6 | Comp. C | 50 mmol of $TiCl_4$ | 120 | 22 |
| Ex. 7 | Comp. E | 20 mmol of $TiCl_4$ | 85 | 1 |
| Ex. 8 | Comp. E | 50 mmol of $TiCl_4$ | 85 | 1 |
| Ex. 9 | Comp. E | 50 mmol of $TiCl_4$ | 85 | 2 |
| Ex. 10 | Comp. F | 100 mmol of $TiCl_4$ | 85 | 2 |
| Ex. 11 | Comp. D | 50 mmol of $TiCl_4$ | 85 | 2 |
| Ex. 12 | Comp. C | 100 mmol of $TiCl_4$ | 85 | 2 |
| Ex. 13 | Comp. D | 570 mmol of $TiCl_4$ | 85 | 2 |
| Ex. 14 | Comp. E | 50 mmol of $SiCl_4$ | 85 | 2 |
| Ex. 15 | Comp. D | 500 mmol of $SiCl_4$ | 85 | 1 |

TABLE 2

| | Analytical results for the washed component $a_0$ or a | | | |
|---|---|---|---|---|
| Component $a_0$ or a | Mg:Ti:Cl | $Cl_{corr.}$/Ti(Si resp) obs. | (theor.) | mmol of Ti/g calculated |
| Comp. C | 1:0.317:2.540 | 1.70 | (3) | 2.10 |
| Comp. D | 1:0.336:2.656 | 1.95 | (3) | 2.60 |
| Comp. E | 1:0.266:2.406 | 1.52 | (3) | 1.62 |
| Comp. F | 1:0.261:2.345 | 1.33 | (3) | 1.58 |
| Example 2 | 1:0.722:3.78 | 2.47 | (3.64) | 2.58 |
| Example 3 | 1:0.723:3.79 | 2.47 | (3.64) | 2.58 |
| Example 4 | 1:0.823:4.11 | 2.56 | (3.67) | 3.30 |
| Example 5 | 1:0.755:4.03 | 2.68 | (3.58) | 3.23 |
| Example 6 | 1:0.797:3.94 | 2.44 | (3.58) | 3.26 |
| Example 7 | 1:0.580:3.56 | 2.68 | (3.54) | 2.53 |
| Example 8 | 1:0.537:3.61 | 3.01 | (3.53) | 2.60 |
| Example 9 | 1:0.471:3.226 | 2.69 | (3.39) | 2.40 |
| Example 10 | 1:0.474:3.336 | 2.82 | (3.45) | 2.40 |
| Example 11 | 1:0.693:3.49 | 2.14 | (3.61) | 3.08 |
| Example 12 | 1:0.639:3.64 | 2.56 | (3.50) | 3.04 |
| Example 13 | 1:0.737:3.773 | 2.41 | (3.54) | 3.16 |
| Example 14 | 1:0.286:2.83 | 2.90 | (3)(Si) | 2.02 |
| Example 15 | 1:0.312:2.850 | 2.73 | (3)(Si) | 2.20 |

TABLE 3

| Test polymerizations: 2 h, 85° C., 2 bar of $H_2$, 5 bar of $C_2H_4$ | | | | | | | | |
|---|---|---|---|---|---|---|---|---|
| Comp. $a_0$/a mmol | Comp. b mmol | CA * | CA ** | MFI 190/5 dg/min | MFR # | $d_{50}$ μm | <100 BD μm % | g/cm$^3$ |
| 0.01 Comp. C | 5 IPRA | 19.7 | 41.4 | 1.20 | 9.3 | 289 | 1.4 | 0.31 |
| 0.01 | 3 TEA | 9.5 | 19.9 | 1.40 | 10.6 | 223 | 2.4 | 0.31 |
| 0.01 Comp. D | 5 IPRA | 22.7 | 58.9 | 2.10 | 10.0 | 374 | 1.2 | 0.34 |
| 0.01 | 3 TEA | 10.5 | 27.3 | 1.94 | 9.3 | 306 | 1.9 | 0.34 |
| 0.02 Comp. E | 5 IPRA | 12.2 | 19.8 | 2.38 | 8.7 | 349 | 2.1 | 0.30 |
| 0.02 | 3 TEA | 12.6 | 20.4 | 3.14 | 9.6 | 361 | 1.2 | 0.29 |
| 0.01 Comp. F | 5 IPRA | 11.5 | 18.3 | 0.79 | 8.9 | 242 | 1.5 | 0.34 |
| 0.01 | 3 TEA | 10.8 | 17.1 | 1.21 | 10.5 | 256 | 0.7 | 0.30 |
| 0.005 Ex. 2 | 5 IPRA | 22.5 | 58.2 | 0.62 | 12.0 | 514 | 1.4 | 0.31 |
| 0.01 Ex. 3 | 5 IPRA | 21.8 | 56.2 | 0.72 | 12.0 | 421 | 0.7 | 0.33 |
| 0.01 Ex. 4 | 5 IPRA | 20.5 | 67.7 | 0.72 | 13.1 | 375 | 1.4 | 0.31 |
| 0.01 Ex. 5 | 5 IPRA | 18.4 | 59.3 | 1.08 | 12.9 | 479 | 0.7 | 0.31 |

TABLE 3-continued

| | | | | | | | |
|---|---|---|---|---|---|---|---|
| 0.01 Ex. 6 | 5 IPRA | 17.3 | 56.3 | 0.51 | 13.8 | 474 | 0.5 | 0.30 |
| 0.005 Ex. 7 | 5 IPRA | 30.7 | 77.6 | 0.93 | 11.6 | 582 | 1.0 | 0.35 |
| 0.005 Ex. 8 | 2 IPRA | 39.8 | 103.5 | 1.35 | 12.2 | 642 | 0.5 | 0.32 |
| 0.005 Ex. 9 | 2 IPRA | 44.8 | 107.5 | 1.58 | 11.7 | 569 | 0.5 | 0.32 |
| 0.005 Ex.10 | 2 IPRA | 37.0 | 88.8 | 0.85 | 12.2 | 537 | 0.6 | 0.33 |
| 0.01 Ex. 11 | 5 IPRA | 20.1 | 61.9 | 0.76 | 12.4 | 368 | 1.0 | 0.31 |
| 0.01 Ex. 12 | 5 IPRA | 21.3 | 64.8 | 1.36 | 12.9 | 446 | 0.7 | 0.33 |
| 0.005 Ex. 13 | 2 IPRA | 24.0 | 75.8 | 0.81 | 12.5 | 359 | 2.2 | 0.30 |
| 0.005 Ex. 14 | 2 IPRA | 34.7 | 70.1 | 1.92 | 10.2 | 477 | 0.7 | 0.32 |
| 0.01 | 3 TEA | 15.7 | 31.7 | 1.89 | 10.7 | 310 | 0.9 | 0.30 |
| 0.01 Ex. 15 | 5 IPRA | 24.3 | 53.5 | 1.79 | 10.4 | 404 | 1.3 | 0.31 |
| 0.01 | 3 TEA | 8.3 | 18.2 | 1.64 | 10.5 | 330 | 1.5 | 0.31 |

Test polymerizations: 2 h, 85° C., 5 bar of H₂, 2 bar of C₂H₄.

| Comp. a mmol | Comp. b mmol | CA g/mmol | CTA$_{red}$ *** | VN cm³/g | d₅₀ μm | <100 BD | |
|---|---|---|---|---|---|---|---|
| | | | | | | μm | g/cm³ |
| 0.01 Ex. 10 | 5 IPRA | 8650 | 2163 | 84 | 168 | 12.5 | 0.29 |
| 0.01 Ex. 14 | 5 IPRA | 8670 | 2168 | 71 | 195 | 16.5 | 0.27 |

*CA [kg of PE/mmol of Ti (Zr, Hf)]
**CA [kg of PE/g of component a₀ or a]
***g/mmol · h · bar
MFR 21.6/5

EXAMPLE 16

100 dm³ of diesel oil were introduced into a 150 dm³ reactor, which was flushed four times with 2 bar of hydrogen. 50 mmol of isoprenylaluminum and 5.9 cm³ (0.5 mmol of Ti) of the dispersion of component b (Example 9) were then introduced, and 0.75 bar of hydrogen was injected. Ethylene was introduced at a rate of 6 kg/h and at a temperature of 85° C. Sufficient hydrogen was subsequently metered in so that the H₂ content in the gas space was 30% by volume during the entire polymerization. After 315 minutes and a final pressure of 8.2 bar, the polymerization was terminated by decompression. The suspension was filtered, and the polyethylene powder was dried by means of a stream of hot nitrogen. 31.6 kg of polyethylene having a density of 0.958 g/cm³ were obtained. This corresponds to a catalyst activity of 151.7 kg of polyethylene/g of component a or 1319 kg of polyethylene/g of Ti. The polyethylene powder had an MFI 190/5 of 0.86, an MFR 21.6/5 of 14.5, a bulk density of 340 g/dm³ and a mean particle diameter of 610 μm. The content of fine particles of <100 μm was less than 1%.

EXAMPLE 17

The preparation was carried out analogously to Example 1 using 10 mmol of Ti-containing suspension from Comparative Example C and 50 mmol of TiCl over the course of 2 hours at a temperature of 80° C.

Analysis: Mg : Ti : Cl=1 : 0.565 : 3.485 Ti³⁺/Ti⁴⁺=0.53; Cl$_{corr}$/Ti=2.63.

Copolymerization of ethylene with 1-butene 100 dm³ of diesel oil were introduced into a 150 dm³ reactor, which was flushed four times with 2 bar of hydrogen. 50 mmol of isoprenylaluminum and 7.2 cm³ (0.6 mmol of Ti) of the dispersion of component a were introduced, and 0.75 bar of hydrogen was injected. At a temperature of 80° C., 100 cm³ of 1-butene were introduced and ethylene was passed in at a rate of 6 kg/h. Sufficient hydrogen was subsequently metered in so that the H₂ content in the gas space was 30% by volume during the entire polymerization. An additional 1100 cm³ of butene were introduced over the course of 2 hours. After 165 minutes and a final pressure of 8.5 bar, the polymerization was terminated by decompression. The suspension was filtered, and the polyethylene powder was dried by means of a stream of hot nitrogen. 17.2 kg of polyethylene were obtained. This corresponds to a catalyst activity of 598 kg of polyethylene/g of Ti. The polyethylene powder had an MFI 190/5 of 3.28 dg/min, an MFR 21.6/5 of 11.0, a bulk density of 360 g/dm³ and a mean particle diameter of 430 μm. The proportion of fine particles of <100 μm was less than 2%. The density was 0.951 g/cm³.

We claim:

1. A process for the preparation of an ethylene polymer having a uniform coarse particle shape and high bulk density by polymerizing ethylene or ethylene with up to 10% by weight, based on the total amount of the monomers, of a 1-olefin of the formula R⁶—CH=CH₂ in which R⁶ is a straight-chain or branched alkyl radical having 1 to 12 carbon atoms, in suspension, in solution or in the gas phase, at a temperature of from 20° to 120° C. and at a pressure of from 2 to 60 bar, which comprises carrying out the polymerization in the presence of a catalyst which comprises a) the entire product of the components consisting essentially of a1) a magnesium alkoxide of the formula I

$$Mg(OR^1)(OR^2) \quad (I)$$

in which R¹ and R² are identical and are an unbranched or branched alkyl radical having 1 to 20 carbon atoms or a —(CH₂)$_n$OR³ radical where R³ is an alkyl radical having 1 to 4 carbon atoms and n is an integer from 2 to 6, a2) a tetravalent transition-metal compound of the formula II

$$M^1X_m(OR^4)_{4-m} \quad (II)$$

in which M¹ is titanium, zirconium or hafnium, R⁴ is an alkyl radical having 1 to 9 carbon atoms, X is a halogen atom and m is an integer from zero to 4, and a3) an organoaluminum compound of the formula III

$$AlR^5_pX_{3-p} \quad (III)$$

in which R⁵ is an alkyl radical having 1 to 6 carbon atoms, X is a halogen atom and p is a number from zero to 3, or the reaction product of a trialkylaluminum compound or dialkylaluminum hydride with a diene, in the Mg:$M^1$:Al ratio of 1:0.05 to 10:0.01 to 4, and a4) a metal halide of the formula IV $$M^2Cl_4 \quad (IV)$$

in which $M^2$ is titanium, silicon or tin, or $BCl_3$, in the $M^1$:$M^2$ ratio of from 1:0.2 to 100, the intermediate product of essentially the components a1, a2, and a3 having been reacted with said component a4, and b) a trialkylaluminum compound having 1 to 6 carbon atoms in the alkyl radicals or the product of the reaction of a trialkylaluminum compound or dialkylaluminum hydride with a diene.

2. A process according to claim 1, wherein the ethylene polymer which is prepared is polyethylene.

3. A process according to claim 1, wherein the ethylene polymer which is prepared is a copolymer of ethylene and at least one additional olefin, said additional olefin being propylene, 1-butene, or 1-hexene.

4. A process according to claim 1, wherein said magnesium alkoxide of component a1 is magnesium diethoxide, magnesium di-n-propoxide, magnesium di-i-butoxide, or mixtures thereof, in the form of a suspension, solution, or gel dispersion; said tetravalent transition metal compound of component a2 is $TiCl_4$; and said organoaluminum compound of component a3 is $Al_2(C_2H_5)_3Cl_3$ or $Al(C_2H_5)_3$ or mixtures thereof.

5. A process according to claim 4, wherein said metal halide of component a4 is $TiCl_4$.

6. A process according to claim 1, wherein said metal halide of component a4 is $TiCl_4$.

7. A process according to claim 1, wherein said component b is triethylaluminum, triisobutylaluminum, triisohexylaluminum, or the product of the reaction of a trialkylaluminum compound or dialkylaluminum hydride with isoprene.

8. A method for polymerizing an olefin comprising ethylene, said method comprising the step of polymerizing the olefin in the presence of a catalyst system wherein said catalyst system comprises a) the entire product of the components consisting essentially of a1) a magnesium alkoxide of the formula I $$Mg(OR^1)(OR^2) \quad (I)$$

in which $R^1$ and $R^2$ are identical and are an unbranched or branched alkyl radical having 1 to 20 carbon atoms or a $-(CH_2)_nOR^3$ radical where $R^3$ is an alkyl radical having 1 to 4 carbon atoms and n is an integer from 2 to 6, a2) a tetravalent transition-metal compound of the formula II $$M^1X_m(OR^4)_{4-m} \quad (II)$$

in which $M^1$ is titanium, zirconium or hafnium, $R^4$ is an alkyl radical having 1 to 9 carbon atoms, X is a halogen atom and m is an integer from zero to 4, and a3) an organoaluminum compound of the formula III $$AlR^5_pX_{3-p} \quad (III)$$

in which $R^5$ is an alkyl radical having 1 to 6 carbon atoms, X is a halogen atom and p is a number from zero to 3, or the reaction product of a trialkylaluminum compound or dialkylaluminum hydride with a diene, in the Mg:$M^1$:Al ratio of 1:0.05 to 10:0.01 to 4, and a4) a metal halide of the formula IV $$M^2Cl_4 \quad (IV)$$

in which $M^2$ is titanium, silicon or tin, or $BCl_3$, in the $M^1$:$M^2$ ratio of from 1:0.2 to 100, the intermediate product of essentially the components a1, a2, and a3 having been reacted with said component a4, and b) a trialkylaluminum compound having 1 to 6 carbon atoms in the alkyl radicals or the product of the reaction of a trialkylaluminum compound or dialkylaluminum hydride with a diene.

9. A method according to claim 8, wherein the olefin comprises ethylene and at least one additional olefin, said additional olefin being propylene, 1 -butene, or 1-hexene.

* * * * *